No. 618,998. Patented Feb. 7, 1899.
W. ROTHE.
PROCESS OF SEPARATING SUBSTANCES IN THE STATE OF SUSPENSION FROM LIQUIDS.
(Application filed Sept. 12, 1898.)
(No Model.)
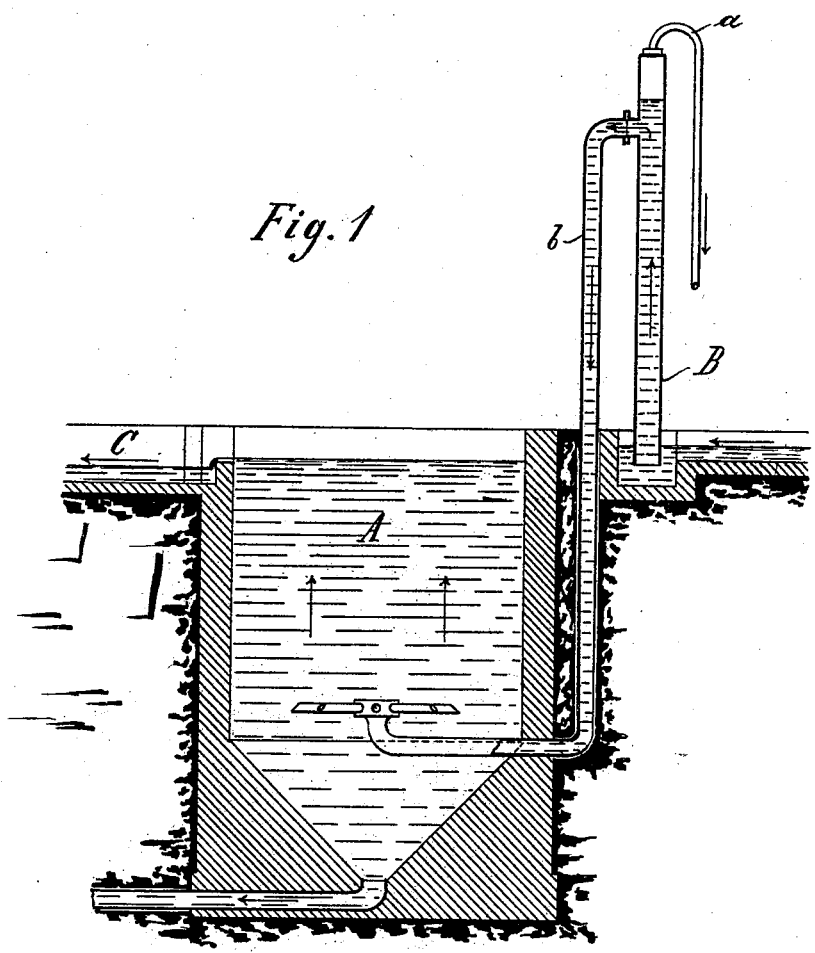
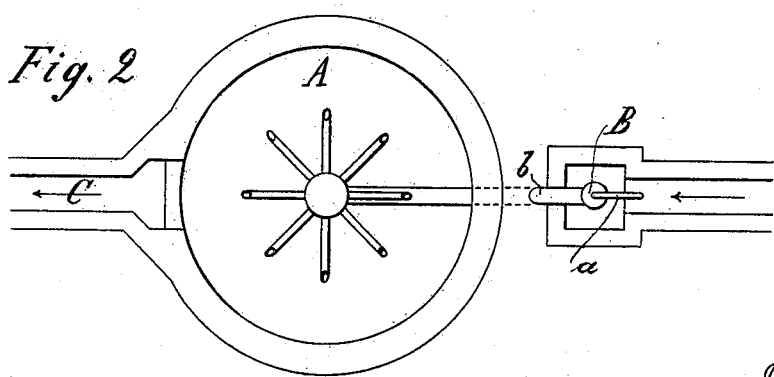
Witnesses:
Inventor
Wilhelm Rothe.
by Herbert W. Jenner.
Attorney.

UNITED STATES PATENT OFFICE.

WILHELM ROTHE, OF GUSTEN, GERMANY.

PROCESS OF SEPARATING SUBSTANCES IN THE STATE OF SUSPENSION FROM LIQUIDS.

SPECIFICATION forming part of Letters Patent No. 618,998, dated February 7, 1899.

Application filed September 12, 1898. Serial No. 690,799. (No specimens.)

*To all whom it may concern:*

Be it known that I, WILHELM ROTHE, a subject of the Duke of Anhalt, residing at Gusten, Anhalt, Germany, have invented certain new and useful Improvements in Processes of Separating Substances in the State of Suspension from Liquids; and I do hereby declare the following to be a full, clear, and exact description of the invention, such as will enable others skilled in the art to which it appertains to make and use the same.

This invention relates to a process for separating suspended matter or slime from liquids.

The invention consists in a modified application of vacuum in clarifying processes.

It is a well-known fact that when liquids are decanted the separation of slime takes place more quickly and easily if the air-pressure is reduced. The explanation of this fact lies in the escape or removal of air from the water, which air adheres in the form of minute bubbles to particles of slime, thus rendering them light and buoyant and preventing them from settling down and forming a firm deposit. If, however, the pressure is reduced, these bubbles escape. This removal of air from the water is usually effected in the interior of the apparatus during the sinking of the slime or suspended matter. The bubbles, rising upward, act in an opposite direction to the descending slime, and therefore prevent it from settling, the buoyant force of the bubbles being about equal to the sinking tendency of the particles of slime, so that the collecting and condensing of these particles into a mass is rendered difficult.

The new process forming the subject of this invention consists in the water being deprived of its air before its admission into the settling apparatus. For this purpose there is arranged near the apparatus a vertical pipe the height of which is equal to the suction height corresponding to the desired reduction of pressure. The water, with its suspended matter, is drawn into this pipe by exhausting the air from the upper part of the pipe or column, so that its air is removed and the water flows near the upper end of the pipe over an overflow into a settling apparatus, and as there are no longer air-bubbles formed the particles of slime come closer together and quickly fall down. The improved result is therefore that the work proceeds much more quickly or that the same output can be obtained with a considerably smaller apparatus, or, what is the same thing, the liquid is clarified in a more perfect manner.

The accompanying drawing shows diagrammatically in section an apparatus for this process.

A is the settling-tank, with a slime-collector underneath, from which the slime or deposited matter can be removed in any desired manner.

B is the pipe or column extending above the water-inlet and serving for the extraction of air. The upper end of said pipe B is connected to an air-exhausting pipe *a*, or an exhausting apparatus (ejector) is directly connected to it. The impure water rising in the pipe B in this way is deprived of its air and flows into the pipe *b*, through which it is led to the lower part of the settling-tank A, where it becomes distributed over the larger area of the latter and rises slowly, depositing its particles of slime or suspended matter. Another result of the present method of extracting air is that heavier admixtures, such as sand, &c., separate during the rising of the water in the correspondingly wide pipe B, the upward tendency of the water not being strong enough to prevent the sinking down of these heavy substances. The sand, sinking down, can then be removed from the water-inlet in any suitable manner. The water freed from slime is discharged at the upper portion of the apparatus A into discharge-conduit C.

What I claim is—

1. A process for facilitating the separation of solid substances from a liquid, which consists in drawing the air from the liquid by reducing the atmospheric pressure on its surface before admitting it to the settling-chamber, substantially as set forth.

2. In apparatus for facilitating the separation of solid substances from a liquid, the combination, with a column B having its lower end in communication with the liquid, of a settling-chamber, an overflow-pipe connected to the upper part of the said column and extending below the bottom end thereof and discharging into the said chamber, and means for exhausting air from the upper part of the said column, substantially as set forth.

In testimony whereof I have affixed my signature in presence of two witnesses.

WILHELM ROTHE.

Witnesses:
 CARL ALBRECHT,
 CHAS. H. DAY.